(12) United States Patent
Oord

(10) Patent No.: US 11,892,069 B2
(45) Date of Patent: Feb. 6, 2024

(54) CAM WHEEL FOR ACCOMMODATING A CAM BELT AS WELL AS METHOD TO PRODUCE THE SAME

(71) Applicant: ARNOLD JÄGER HOLDING GMBH, Hannover (DE)

(72) Inventor: Johan Oord, Groningen (DE)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 11 days.

(21) Appl. No.: 17/685,784

(22) Filed: Mar. 3, 2022

(65) Prior Publication Data

US 2022/0282778 A1    Sep. 8, 2022

(30) Foreign Application Priority Data

Mar. 4, 2021  (EP) ..................... 21160772

(51) Int. Cl.
| | |
|---|---|
| *F16H 55/17* | (2006.01) |
| *F16H 55/10* | (2006.01) |
| *B65G 23/06* | (2006.01) |
| *F16H 7/02* | (2006.01) |

(52) U.S. Cl.
CPC ........... *F16H 55/171* (2013.01); *B65G 23/06* (2013.01); *F16H 55/10* (2013.01); *F16H 7/023* (2013.01)

(58) Field of Classification Search
CPC ........ F16H 7/023; F16H 55/171; F16H 55/10; B65G 23/06
USPC ........................... 474/152, 153, 162; 198/835
See application file for complete search history.

(56) References Cited

U.S. PATENT DOCUMENTS

| | | | |
|---|---|---|---|
| 3,472,563 A | 10/1969 | Irgens | |
| 4,908,002 A * | 3/1990 | Tanis | ............... A01D 61/008 460/114 |
| 9,706,715 B2 | 7/2017 | Fuchs | |
| 10,183,807 B2 | 1/2019 | Jäger | |
| 2011/0300978 A1* | 12/2011 | Sakamoto | ............. F16H 55/171 474/152 |
| 2012/0186949 A1 | 7/2012 | Gentz | |
| 2014/0064931 A1* | 3/2014 | Furusawa | ............... F16H 55/36 415/122.1 |
| 2016/0236749 A1* | 8/2016 | Cody | ........................ B62M 9/02 |
| 2017/0037940 A1* | 2/2017 | Serkh | .................... F16H 7/0831 |
| 2017/0113876 A1* | 4/2017 | Jäger | ..................... B65G 15/12 |

(Continued)

FOREIGN PATENT DOCUMENTS

| | | | | |
|---|---|---|---|---|
| DE | 102009036104 A1 | 2/2011 | | |
| DE | 102011050840 | * 12/2011 | ............. | F16H 55/00 |

(Continued)

*Primary Examiner* — James R Bidwell
(74) *Attorney, Agent, or Firm* — Barnes & Thornburg LLP

(57) ABSTRACT

A cam wheel for accommodating a cam belt has a hub plate for mounting on a shaft and a plurality of cylindrical bolts including belt support areas for accommodating the cam belt. The cylindrical bolts are attached to the hub plate such that gaps are formed between the cylindrical bolts for accommodating cams of the cam belt in a positive locking manner. At a first end of the respective cylindrical bolts a shaft is formed which is inserted into an opening in the hub plate. The shaft is reshaped at its end to form a closing head in such a manner that the hub plate is clamped in between the closing head and a shoulder is formed between the shaft and the belt area support.

10 Claims, 5 Drawing Sheets

(56) References Cited

U.S. PATENT DOCUMENTS

2020/0300339 A1* 9/2020 Beaudet ................. F16H 1/203
2020/0408279 A1* 12/2020 Katayama ............... F16H 19/04

FOREIGN PATENT DOCUMENTS

| EP | 2965612 A1 | 1/2016 | | |
|----|------------|--------|---|---|
| EP | 3289854 A1 | 3/2018 | | |
| EP | 3381268 A1 | 10/2018 | | |
| EP | 3158851 B1 | 5/2019 | | |
| EP | 4124234 | * 4/2022 | ............ | B65G 23/06 |

* cited by examiner

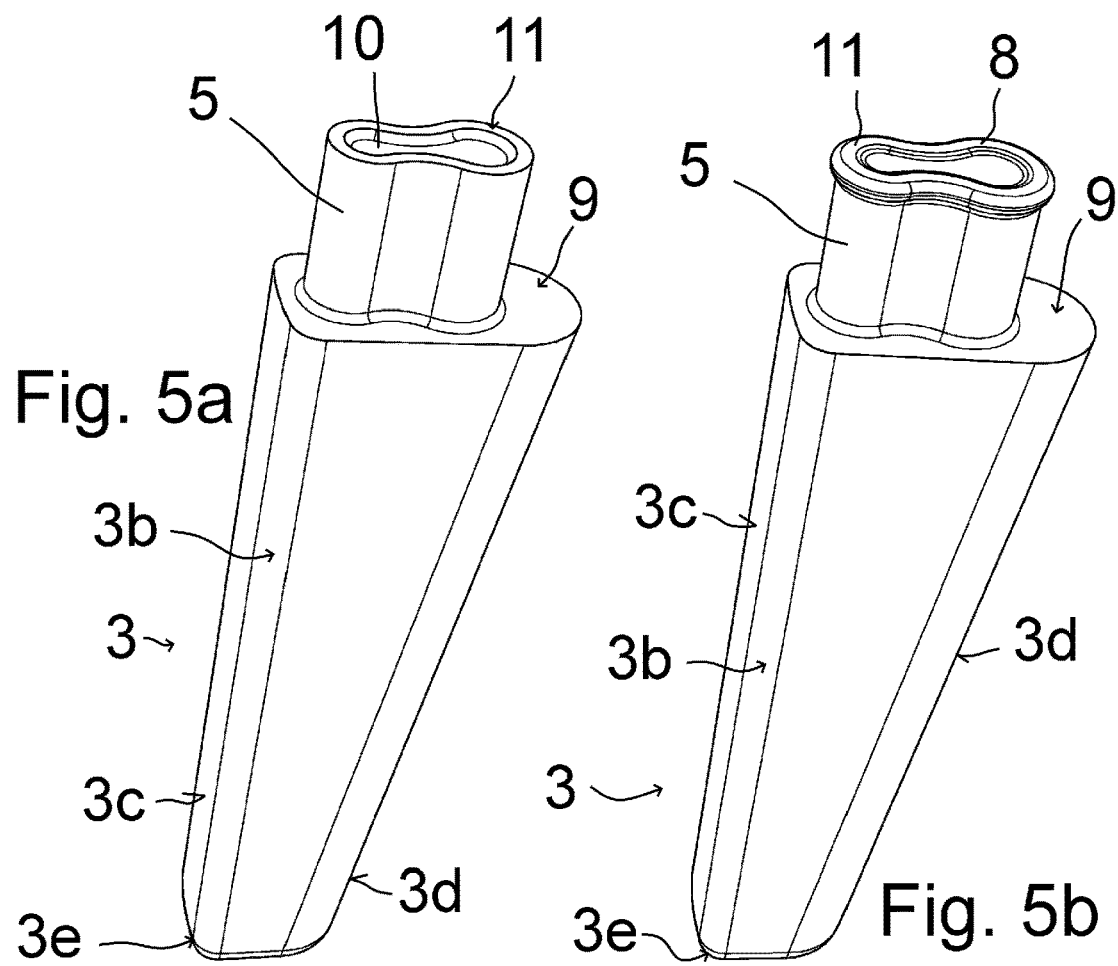
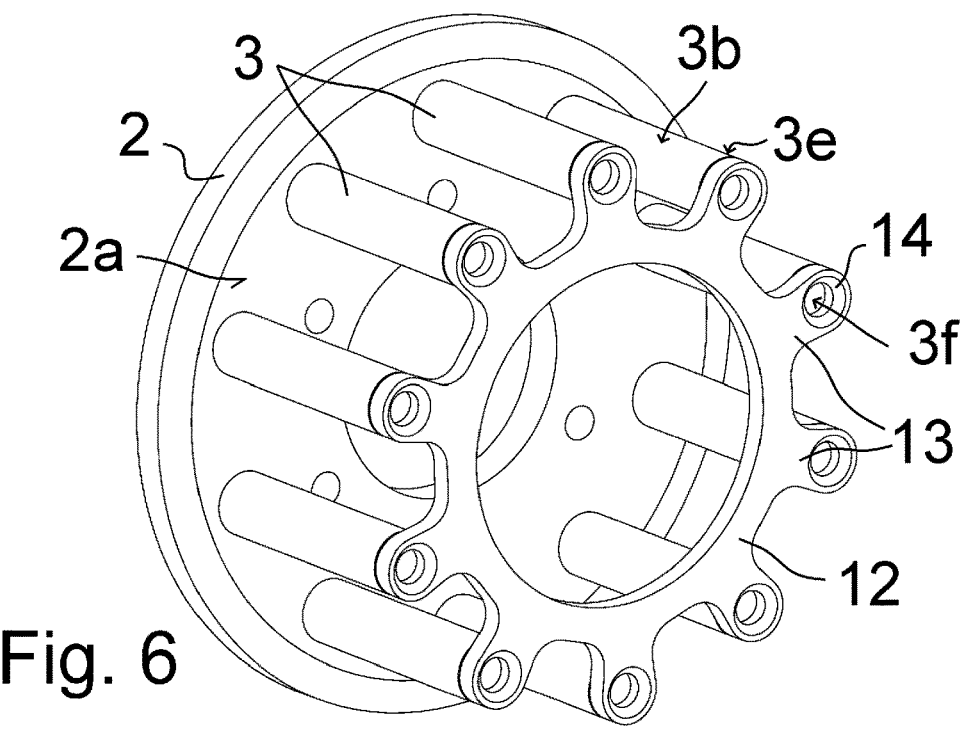

CAM WHEEL FOR ACCOMMODATING A CAM BELT AS WELL AS METHOD TO PRODUCE THE SAME

PRIORITY CLAIM

This application claims priority to European Patent Application No. EP21160772.6, filed Mar. 4, 2021, which is expressly incorporated by reference herein.

BACKGROUND

The present disclosure relates to a cam wheel for accommodating a cam belt, for example, in an agricultural machine or in a transport system in the process industry or in washing systems, as well as method for manufacturing such a cam wheel.

SUMMARY

According to the present disclosure, a cam wheel includes a plurality of tappet means, or fingers or teeth respectively, projecting perpendicularly away from a hub plate and being spaced apart from one another, that a shaft is formed at one end of the respective tappet means which is inserted into an opening in the hub plate, and that the shaft is reshaped at its end to form a closing head such that the hub plate is clamped-in between the closing head and a shoulder formed between the shaft and a belt support area of the tappet means.

In illustrative embodiments, this allows for a flexible attachment of the tappet means to the hub plate because the openings can be introduced into the hub plate lying in a circle at a distance adapted to the spacing of the cam belt to be used and, subsequently, tappet means which are prefabricated and can be stored in large quantities can be attached to the hub plate by inserting and reshaping.

In illustrative embodiments, the hub plate may be manufactured in a flexible manner using a stream cutting process such as laser cutting or water jet cutting. This enables easy adaptation of the cam wheel to differently spaced cam belts without having to adapt the tools used for this in a complex manner. Even an adaptation of the tappet means is possible without any complex adaptation.

In illustrative embodiments, the connecting procedure, which can happen similar to a riveting process, with the tappet means itself functioning as a rivet, can be carried out in a simple manner, for example, using a press or a pressing tool respectively, which is preferably capable of simultaneously carrying out a plurality of reshaping procedures for forming the closing head. Thus, it is possible to attach several, preferably all, inserted tappet means to the hub plate at the same time. This allows to minimise the cost and complexity of assembly.

The general type upon which this is based is a cam wheel for accommodating a cam belt, for example in an agricultural machine or in a transport system in the process industry or in washing systems, where the cam wheel drives the cam belt or the cam wheel merely serves as a deflecting pulley and the driven cam belt carrying along the cam wheel. The cam wheel includes the hub plate to be mounted on a shaft, for example on a driving shaft or slaving shaft, and the plurality of tappet means, attached thereto in the manner described above, having belt support areas for accommodating the cam belt, where the cam belt rests on the belt support areas, in particular, between the cams. The tappet means are attached to the hub plate projecting perpendicularly in such a manner that gaps are formed between the tappet means to receive the cams of the cam belt by positive locking.

In illustrative embodiments, the tappet means are designed, in the belt support area in the region of the shaft, to be symmetrical in cross-section, in particularly round, or asymmetrical. This allows choosing a different cross-section of the cam wheel depending on the needs or application so as to provide desired running of the cam belt on the cam wheel. By virtue of an asymmetrical shaft, it is possible to additionally achieve protection against rotation and assembly with correct alignment of the asymmetrically shaped tappet means.

In illustrative embodiments, the tappet means tapers in the belt starting from the shoulder towards a second end of the tappet means. This way, too, a variable, application specific shape of the tappet means can be used to achieve desired or, respectively desired running of the cam belt.

In illustrative embodiments, at a second end of at least some of the tappet means a washer is attached which is arranged concentrically with respect to the hub plate. By virtue of such a washer, it is possible to additionally reinforce the cam wheel thereby avoiding buckling of the tappet means under load from the cam belt because forces can be deflected additionally to the washer.

In illustrative embodiments, it may be provided for the washer to be attached by means of positive locking and/or frictional connection to the second ends of the at least some tappet means, for example screwed on and/or welded on and/or the washer being clamped to the tappet means at the end. Thus, a number of types of connections are possible, whereby, in particular, the "rivet connection" similar to the connection between the shaft and the hub plate may be provided, to clamp the washer to the tappet means at the end so that as to enable an overall flexible and simple assembly without additional connecting means.

In illustrative embodiments, a method for producing a cam wheel, in particular a cam wheel according to the present disclosure, is provided including at least the following steps:

providing a hub plate having a plurality of openings as well as a plurality of tappet means with belt support areas for accommodating a cam belt;

inserting the tappet means into the openings of the hub plate from a front side of the hub plate such that the tappet means project perpendicularly, i.e. parallel to a rotational axis of the cam wheel, away from the front face of the hub plate and a gap is formed between the tappet means inserted in the hub plate due to a distance (A) between the openings, in which gap the cams of the cam belt supported in operation are located;

forming a closing head on a rear face of the hub plate by reshaping the end of a part of the shaft projecting out of the openings on the rear face of the hub plate, so that the hub plate is clamped-in between the closing head formed and a shoulder formed between the shaft and the belt support area.

In illustrative embodiments, even the tappet means itself may function as a connecting means of the type of a rivet so as to allow the tappet means to be affixed, perpendicularly projecting, to the hub plate in a simple manner.

In illustrative embodiments, a recess, for example a bore hole or a milling groove, is introduced into the shaft on an end face thereof, so that a ring-shaped end region is formed at the shaft, and the ring-shaped end region of the shaft is reshaped circumferentially outwards so as to form the closing head, for example, by means of a press or a pressing tool respectively which is pressed onto the shaft at its end. This way it is possible to simplify the reshaping process because it is merely the ring-shaped region that needs to be bent sidewards to form the closing head and cause the clamping of the hub plate.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 5a and 5b are a series of views showing an alternative embodiment of tappet means; and FIG. 6 is a perspective view of a cam wheel with an additional safety washer.

DETAILED DESCRIPTION

Figure 1:
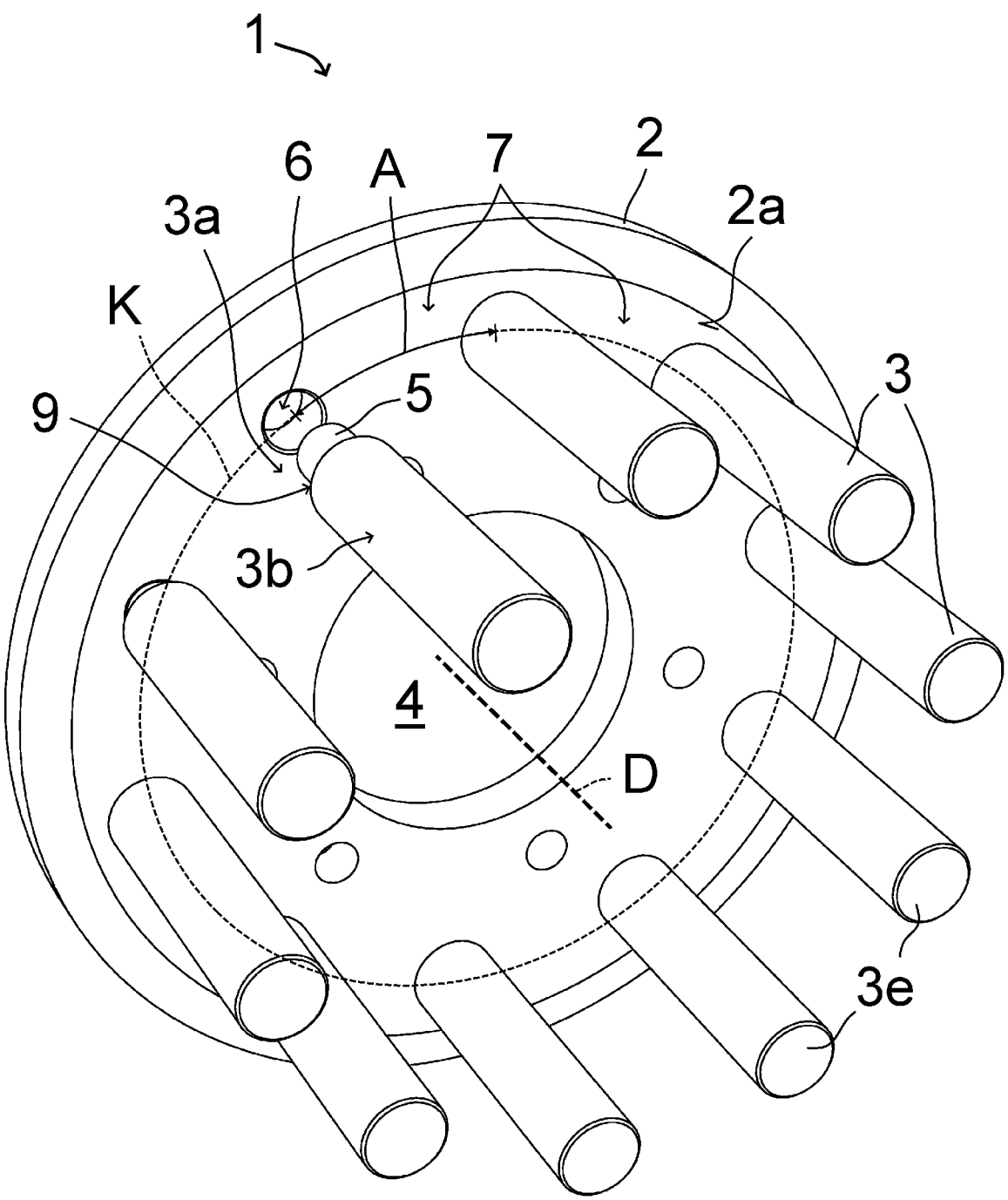
FIG. 1 is a perspective front view of a cam wheel.
Figure 2:
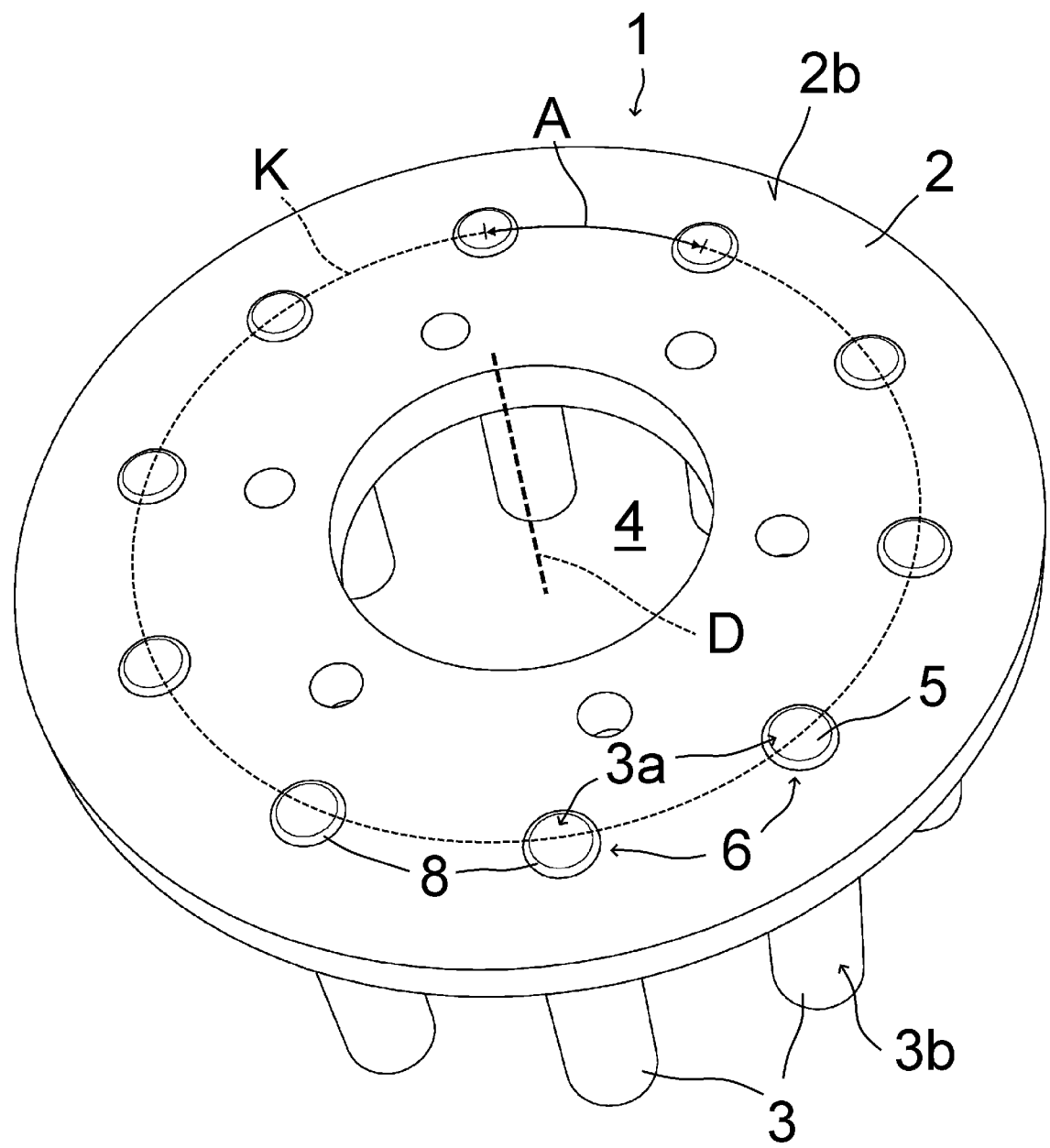
FIG. 2 is a perspective rear view of the cam wheel according to FIG. 1.

FIG. 1 and FIG. 2 each show a cam wheel 1 in a perspective view. The cam wheel 1 comprises a hub plate 2 on the circumference of which tappet means 3 are arranged which, in the embodiment example shown, are designed as cylindrical bolts. The hub plate 2 comprises a through hole 4 by means of which the cam wheel 1 can be mounted on a shaft, not shown, to allow rotation of the cam wheel 1 about a corresponding axis of rotation D.

Figure 3A:
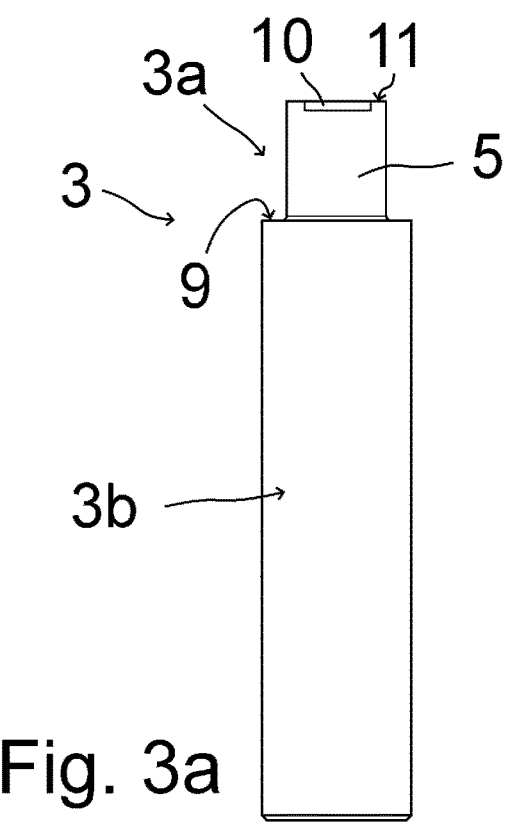
FIGS. 3a and 3b are a series of top views showing tappet means of the cam wheel according to FIG. 1.
Figure 3B:
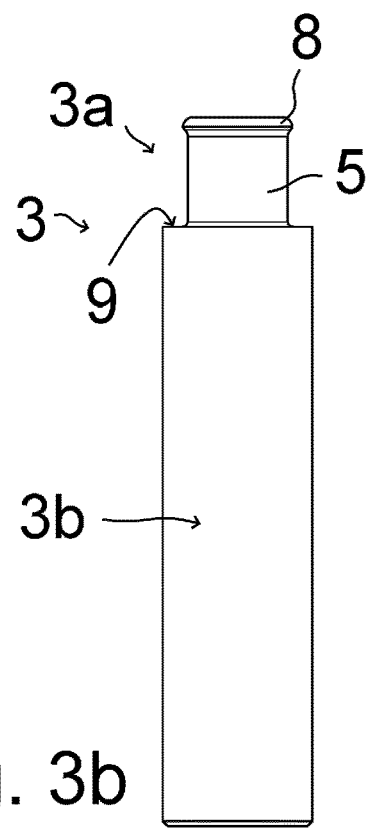
Figure 4A:
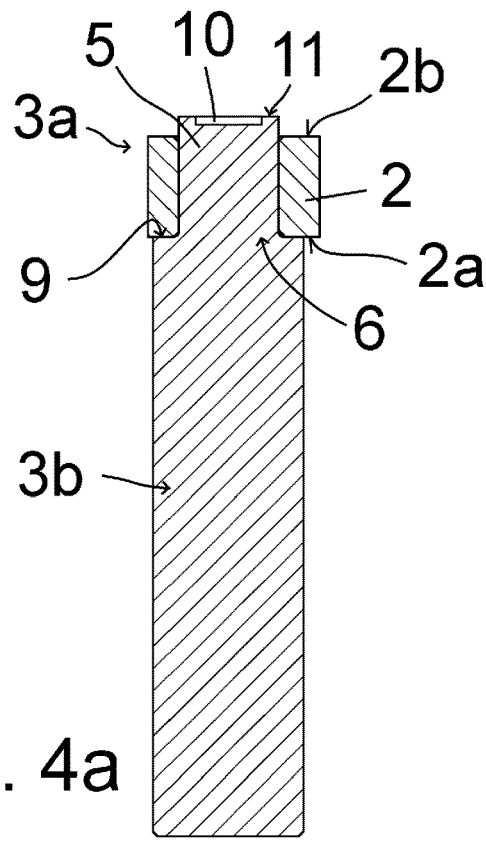
FIGS. 4a and 4b are a series of sectional views showing the tappet means in the assembled state.

As indicated in the FIGS. 3a, 3b, the tappet means 3 each comprise a shaft 5 at a first end 3a which, in the embodiment example shown, has a round cross-section. Moreover, a belt support area 3b also having a round cross-section is provided on the tappet means 3, the diameter of which is larger than the diameter of the shaft 5. This creates a shoulder 9 between the shaft 5 and the belt support area 3b. For mounting the tappet means 3 the shaft 5 is inserted through an opening 6 (in this case circular) in the hub plate 2 formed complementary to the shaft 5 until the shoulder 9 rests against a front face 2a of the hub plate 2 and the shaft 5 projects from the hub plate 2 at a rear face 2b (see FIG. 4a).

Figure 4B:
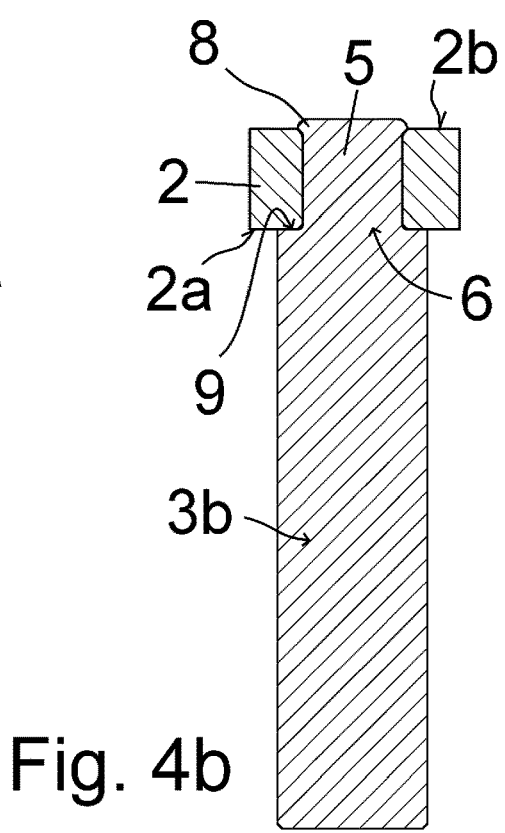

According to the present disclosure, the inserted tappet means 3 are attached to the hub plate 2 by means of a reshaping process which happens similar to a riveting process. Hereby, the part of the shaft 5 projecting out of the rear side 2b is reshaped, for example, by means of a press or a pressing tool respectively, uniformly towards all sides in such a manner that it widens sideways thereby forming a type of closing head 8 (s. FIG. 4b). In this state, the shaft 5 reshaped at its end is widened to the extent that the hub plate 2 is clamped-in between the closing head 8 and the shoulder 9, as shown in FIG. 4b. Thus, the tappet means 3 is utilised as a "rivet" to form a type of rivet connection, where the shaft 5 reshaped at its end forms the "closing head" and the shoulder 9 with the belt support area 3b sort of forms the "snap head." The so described reshaping process/riveting process may happen, for example, such that the press reshapes not only one shaft 5 at its end but a plurality of shafts 5 of different inserted tappet means 3, preferably all shafts 5, simultaneously.

In order to simplify the reshaping of the end of the shaft 5, it may be provided for the shaft 5 to comprise a recess 10 at a front face or, respectively, coaxial to its central axis, for example a milled groove or a bore hole, through which a ring-shaped end region 11 is formed at the shaft 5. Under exertion of a suitable force this can be reshaped towards all sides in a simple manner by a press so as to form the closing head 8.

Figure 1A:
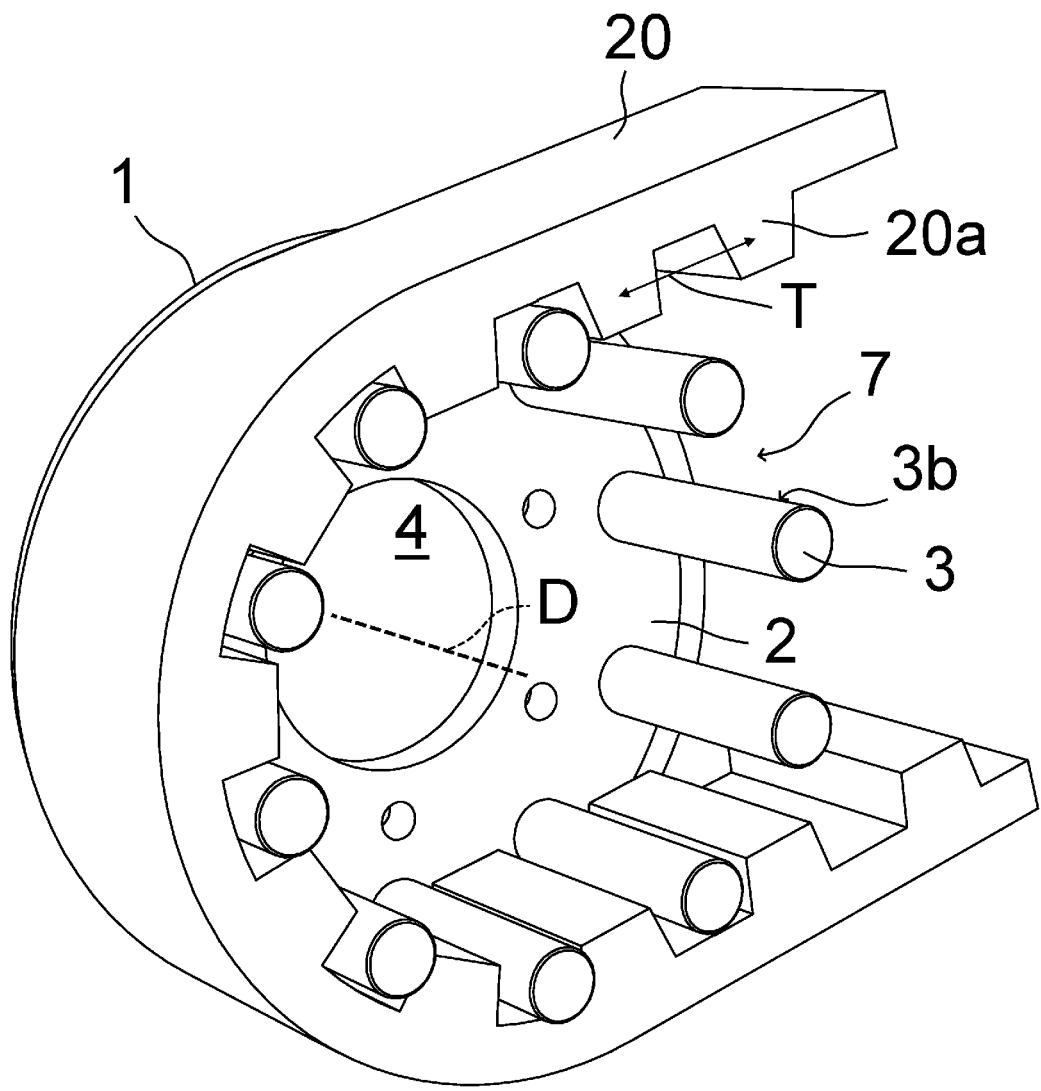
FIG. 1a is a perspective view of the cam wheel according to FIG. 1 with a cam belt.

This way, each tappet means 3 is mounted in an opening 6 in the hub plate 2, with the openings 6 being arranged on the circumference of the hub plate 2 in a circle K at a pre-determined distance A, thereby creating a gap 7 between the tappet means 3 due to the distance A. Hereby, the distance A of the openings 6 is matched to a spacing T of the cams 20a of a cam belt 20, shown in FIG. 1a, which rotates on the cam wheel 1. With pre-fabricated tappet means 3 it is easily and flexibly possible to react in production of the cam wheel 1 to a desired spacing T of a cam belt 20 by correspondingly choosing the distances A of the openings 6.

Hereby, in the mounted state, the tappet means 3 projects perpendicularly, i.e. parallel to the axis of rotation D, away from the front face 2a of the hub plate 2. This allows the cam belt 20 rotating on the cam wheel 1 to rest on the belt support area 3b of the mounted tappet means 3, whereby the cams 20a of the cam belt 20 lie inside the gaps 7 between two tappet means 3 formed by the distance A so that the cam belt 20 can be carried along by a driven cam wheel 1 in a suitable manner by positive locking or, respectively, a driven cam belt 20 can carry along a slaving cam wheel 1.

According to FIGS. 5a, 5b, the cross-section of the tappet means 3 may deviate from a circular shape, where, in that case, the shaft 5 or, respectively, the opening 6 in the hub plate 2 formed complementary thereto, too, no longer exhibit a circular cross-section but rather an asymmetrical cross-section. In this embodiment, an upper side 3c of the mounted tappet means 3 runs in the belt support area 3b upon which the cam belt 20 rests between the cams 20, parallel to the axis of rotation D, while a bottom side 3d of the tappet means 3 is angled in relation thereto so that the tappet means 3 thins down towards an open second end 3e. To make it simple to adhere with this orientation during assembly, the shaft 5 formed at the first end 3a or, respectively, the opening 6 in the hub plate 2 formed complementary thereto also exhibit an asymmetrical cross-section. The reshaping at the end happens similar to the procedure carried out in the case of the cylindrical tappet means 3.

According to FIG. 6, it is further provided that the tappet means 3 are each connected to an additional washer 12 at their second end 3e opposite the shaft 5, the washer lying parallel or concentrically respectively to the hub plate 2. In the embodiment example shown, internal threads 3f are provided each in the two ends 3e of the tappet means 3 and bore holes 14 are arranged in the washer 12 at fingers 13 sticking out so that the washer 12 can be affixed to the end of the tappet means 3 via a screw (not shown). This additional washer 12 may prevent buckling of the tappet means 3 under load thereby adding stability to the cam wheel 1.

Alternatively, the connection between the washer 12 and the tappet means 3 may be made using a welding connection or also using a rivet connection as described above, where, in that case, the second ends 3e may be inserted through the bore holes 14 in the washer 12 and subsequently reshaped into a closing head in order to also clamp in the washer 12 in a manner similar to the hub plate 2.

The present disclosure relates to a cam wheel for accommodating a cam belt, for example, in an agricultural machine or in a transport system in the process industry or in washing systems, as well as method for manufacturing such a cam wheel.

Agricultural machines may comprise a plurality of bands or belts respectively designed to be continuous, which in operation of the machines each circulate endlessly on at least two rollers or wheels respectively between which they are tension mounted. In one example, one of the wheels serves as drive of the belt and the other wheel or wheels respectively serve(s) as deflection. For example, the wheels may be belt disks, upon which flat belts lie in a friction-type connection or load carrying connection respectively, or cam wheels, upon which cam belts rest in a positive locking manner. In process industry, too, transport belts or conveyor belts respectively circulate on cam wheels of such types.

Such comparative cam wheels, for example, comprise hub plates, which are mounted on a drive shaft such that they cannot rotate, at the circumference of which tappet means in the form of cylindrical bolts are welded perpendicularly projecting away there from. In operation, the cams of the cam belt lie in gaps between the tappet means so that the cam belt can be carried along by means of positive locking when the drive shaft is driven or, respectively, the comparative cam wheel serving only for deflection can be carried along by the driven cam belt. Instead of welding the tappet means to the hub plates, the comparative cam wheels may be designed as one piece together with the tappet means as a cast component.

It is a disadvantage in these comparative solutions that the production of comparative cam wheels of this type as cast components or including taped means welded onto them is complex and costly. Also, it involves great efforts to adapt a cast cam wheel to cam belts with differing spacing because is required much effort to adapt the molds.

Thus, it is the object of the present disclosure to provide a cam wheel which can be assembled in a modular or, respectively, flexible manner while being quick and easy to produce.

This task is solved according to the present disclosure by a cam wheel according to the present disclosure as well as a method for producing such a cam wheel according to the present disclosure.

Thus, according to the present disclosure, it is provided, with a cam wheel having a plurality of tappet means, or fingers or teeth respectively, projecting perpendicularly away from a hub plate and being spaced apart from one another, that a shaft is formed at one end of the respective tappet means which is inserted into an opening in the hub plate, and that the shaft is reshaped at its end to form a closing head such that the hub plate is clamped-in between the closing head and a shoulder formed between the shaft and a belt support area of the tappet means.

This, advantageously, allows for a flexible attachment of the tappet means to the hub plate because the openings can be introduced into the hub plate lying in a circle at a distance adapted to the spacing of the cam belt to be used and, subsequently, tappet means which are pre-fabricated and can be stored in large quantities can be attached to the hub plate by inserting and reshaping. Hereby, for example, the hub plate can then be manufactured in a flexible manner using a stream cutting process such as laser cutting or water jet cutting. This enables easy adaptation of the cam wheel to differently spaced cam belts without having to adapt the tools used for this in a complex manner. Even an adaptation of the tappet means is possible without any complex adaptation.

Moreover, the connecting procedure, which can happen similar to a riveting process, with the tappet means itself functioning as a rivet, can be carried out in a simple manner, for example, using a press or a pressing tool respectively, which is preferably capable of simultaneously carrying out a plurality of reshaping procedures for forming the closing head. Thus, it is possible to attach several, preferably all, inserted tappet means to the hub plate at the same time. This permits minimizing the cost and complexity of assembly.

The general type upon which this is based is a cam wheel for accommodating a cam belt, for example in an agricultural machine or in a transport system in the process industry or in washing systems, where the cam wheel drives the cam belt or the cam wheel merely serves as a deflecting pulley and the driven cam belt carrying along the cam wheel. The cam wheel includes the hub plate to be mounted on a shaft, for example on a driving shaft or slaving shaft, and the plurality of tappet means, attached thereto in the manner described above, having belt support areas for accommodating the cam belt, where the cam belt rests on the belt support areas, in particular, between the cams. The tappet means are attached to the hub plate projecting perpendicularly in such a manner that gaps are formed between the tappet means to receive the cams of the cam belt by positive locking.

It is further provided that the tappet means are designed, in the belt support area in the region of the shaft, to be symmetrical in cross-section, in particularly round, or asymmetrical. This allows choosing a different cross-section of the cam wheel depending on the needs or application so as to provide desired running of the cam belt on the cam wheel. By virtue of an asymmetrical shaft, it is possible to additionally achieve protection against rotation and assembly with correct alignment of the asymmetrically shaped tappet means.

It is further provided that the tappet means tapers in the belt starting from the shoulder towards a second end of the tappet means. This way, too, a variable, application specific shape of the tappet means can be used to achieve desired or, respectively desired running of the cam belt.

It is further provided that at a second end of at least some of the tappet means a washer is attached which is arranged concentrically with respect to the hub plate. By virtue of such a washer, it is possible to additionally reinforce the cam wheel thereby avoiding buckling of the tappet means under load from the cam belt because forces can be deflected additionally to the washer.

To that end, it may be provided for the washer to be attached by means of positive locking and/or frictional connection to the second ends of the at least some tappet means, for example screwed on and/or welded on and/or the washer being clamped to the tappet means at the end. Thus, a number of types of connections are possible, whereby, in particular, the "rivet connection" similar to the connection between the shaft and the hub plate may be provided, to clamp the washer to the tappet means at the end so that as to enable an overall flexible and simple assembly without additional connecting means.

Also, according to the present disclosure, a method for producing a cam wheel, in particular a cam wheel according to the present disclosure, is provided including at least the following steps:

providing a hub plate having a plurality of openings as well as a plurality of tappet means with belt support areas for accommodating a cam belt;

inserting the tappet means into the openings of the hub plate from a front side of the hub plate such that the tappet means project perpendicularly, i.e. parallel to a rotational axis of the cam wheel, away from the front face of the hub plate and a gap is formed between the tappet means inserted in the hub plate due to a distance (A) between the openings, in which gap the cams of the cam belt supported in operation are located;

forming a closing head on a rear face of the hub plate by reshaping the end of a part of the shaft projecting out of the openings on the rear face of the hub plate, so that the hub plate is clamped-in between the closing head formed and a shoulder formed between the shaft and the belt support area.

This way, even the tappet means itself may function as a connecting means of the type of a rivet so as to allow the tappet means to be affixed, perpendicularly projecting, to the hub plate in a simple manner.

Hereby, it is provided that a recess, for example a bore hole or a milling groove, is introduced into the shaft on an end face thereof, so that a ring-shaped end region is formed at the shaft, and the ring-shaped end region of the shaft is reshaped circumferentially outwards so as to form the closing head, for example, by means of a press or a pressing tool respectively which is pressed onto the shaft at its end. This way it is possible to simplify the reshaping process because it is merely the ring-shaped region that needs to be bent sidewards to form the closing head and cause the clamping of the hub plate.

The present disclosure relates to a cam wheel (1) for accommodating a cam belt, having a hub plate (2) for mounting on a shaft and a plurality of tappet means (3) including belt support areas (3b) for accommodating the cam belt (20), the tappet means (3) being attached, projecting perpendicularly away from the hub plate (2) and spaced apart from one another, to the hub plate (2) such that gaps (7) are formed between the tappet means (3) for accommodating cams (20a) of the cam belt (20) in a positive locking manner.

The present disclosure provides that at a first end (3a) of the respective tappet means (3) a shaft (5) is formed which is inserted into an opening (6) in the hub plate (2), the shaft (5) being reshaped at its end to form a closing head (8) in such a manner that the hub plate (2) is clamped-in between the closing head (8) and a shoulder (9) formed between the shaft (5) and the belt support area (3b).

The following numbered clauses include embodiments that are contemplated and non-limiting:

Clause 1. A cam wheel (1) for accommodating a cam belt (20), having a hub plate (2) for mounting on a shaft and a plurality of tappet means (3) including belt support areas (3b) for accommodating the cam belt (20), the tappet means (3) being attached, projecting perpendicularly away from the hub plate (2) and spaced apart from one another, to the hub plate (2) such that gaps (7) are formed between the tappet means (3) for accommodating cams (20a) of the cam belt (20) in a positive locking manner, wherein at a first end (3a) of the respective tappet means (3) a shaft (5) is formed which is inserted into an opening (6) in the hub plate (2), the shaft (5) being reshaped at its end to form a closing head (8) in such a manner that the hub plate (2) is clamped-in between the closing head (8) and a shoulder (9) formed between the shaft (5) and the belt support area (3b).

Clause 2. The cam wheel (1) of clause 1, any other suitable clause or any combination of suitable clauses, wherein the tappet means (3) is designed, in the belt support area (3b) and/or in the region of the shaft (5), to be symmetrical in cross-section, in particularly round, or asymmetrical.

Clause 3. The cam wheel (1) according to clause 1 or 2, any other suitable clause or any combination of suitable clauses, wherein the closing head (8) is formed by a reshaped ring-shaped end region (11) of the shafts (5), the ring-shaped end region (11) being formed by a recess (10) introduced into the end face in the shaft (5).

Clause 4. The cam wheel (1) of any other suitable clause or any combination of suitable clauses, wherein the tappet means (3) tapers in the belt support area (3b) starting from the shoulder (9).

Clause 5. The cam wheel (1) of any other suitable clause or any combination of suitable clauses, wherein at a second end (3e) of at least some of the tappet means (3) a washer (12) is attached, arranged concentrically with respect to the hub plate (2).

Clause 6. The cam wheel (1) of clause 5, any other suitable clause or any combination of suitable clauses, wherein the washer (12) is attached by means of positive locking and/or frictional connection to the second ends (3e) of the at least some tappet means (3), for example screwed on and/or welded on and/or clamped to the tappet means (3) at the ends.

Clause 7. A method for producing a cam wheel (1), in particular a cam wheel (1) according to any other suitable clause or any combination of suitable clauses, including at least the following steps:

providing a hub plate (2) having openings (6) as well as a plurality of tappet means (3) with belt support areas (3b) for accommodating a cam belt (20);

inserting the tappet means (3) into the openings (6) of the hub plate (2) such that the tappet means (3) project perpendicularly away from a front face (2a) of the hub plate (2) and a gap (7) is formed between the inserted tappet means (3) due to a distance (A) between the openings (6);

forming a closing head (8) on a rear face (2b) of the hub plate (2) by reshaping the end of a part of the shaft (5) projecting out of the openings (6) on the rear face (2b) of the hub plate (2b), so that the hub plate (2) is clamped-in between the closing head (8) formed and a shoulder (9) formed between the shaft (5) and the belt support area (3b).

Clause 8. The method of clause 7, any other suitable clause or any combination of suitable clauses, wherein a recess (10) is introduced into the shaft (5) on an end face thereof so that a ring-shaped end region (11) is formed at the shaft (5), and the ring-shaped end region (11) of the shaft (5) is reshaped so as to form the closing head (8).

Clause 9. The method according to clauses 7 or 8, any other suitable clause or any combination of suitable clauses, wherein the forming of the closing head (8) happens by means of a pressing tool which reshapes the shaft (5) at its end.

Clause 10. The method according to one of the clauses 7 through 9, any other suitable clause or any combination of suitable clauses, wherein the forming of the closing head (8) happens simultaneously for a plurality of tappet means (3).

The invention claimed is:

1. A cam wheel for accommodating a cam belt, the cam wheel comprising
a hub plate for mounting on a shaft and a plurality of tappet means including belt support areas for accommodating the cam belt, the tappet means being attached, projecting perpendicularly away from the hub plate and spaced apart from one another, to the hub plate such that gaps are formed between the tappet means for accommodating cams of the cam belt in a positive locking manner, wherein at a first end of the respective tappet means a shaft is formed which is inserted into an opening in the hub plate, the shaft being reshaped at its end to form a closing head in such a manner that the hub plate is clamped-in between the closing head and a shoulder formed between the shaft and the belt support area.

2. The cam wheel of claim 1, wherein the tappet means is designed, in the belt support area and/or in the region of the shaft, to be symmetrical in cross-section, in particularly round, or asymmetrical.

3. The cam wheel of claim 1, wherein the closing head is formed by a reshaped ring-shaped end region of the shafts, the ring-shaped end region being formed by a recess introduced into the end face in the shaft.

4. The cam wheel of claim 1, the tappet means tapers in the belt support area starting from the shoulder.

5. The cam wheel of claim 1, wherein at a second end of at least some of the tappet means a washer is attached, arranged concentrically with respect to the hub plate.

6. The cam wheel of claim 5, wherein the washer is attached by means of positive locking and/or frictional connection to the second ends of the at least some tappet means, for example screwed on and/or welded on and/or clamped to the tappet means at the ends.

7. A method for producing the cam wheel of claim 1, the method comprising the steps of
   providing a hub plate having openings as well as a plurality of tappet means with belt support areas for accommodating a cam belt;
   inserting the tappet means into the openings of the hub plate such that the tappet means project perpendicularly away from a front face of the hub plate and a gap is formed between the inserted tappet means due to a distance between the openings;
   forming a closing head on a rear face of the hub plate by reshaping the end of a part of the shaft projecting out of the openings on the rear face of the hub plate, so that the hub plate is clamped-in between the closing head formed and a shoulder formed between the shaft and the belt support area.

8. The method of claim 7, wherein a recess is introduced into the shaft on an end face thereof so that a ring-shaped end region is formed at the shaft, and the ring-shaped end region of the shaft is reshaped so as to form the closing head.

9. The method of claim 7, wherein the forming of the closing head happens by means of a pressing tool which reshapes the shaft at its end.

10. The method of claim 7, wherein the forming of the closing head happens simultaneously for a plurality of tappet means.

* * * * *